United States Patent [19]
Fitzpatrick et al.

[11] Patent Number: 5,691,857
[45] Date of Patent: Nov. 25, 1997

[54] METHOD USING MATCHED FILTERS FOR DETERMINING HEAD POSITIONER MICRO-JOG IN HARD DISK DRIVE EMPLOYING MAGNETO-RESISTIVE HEADS

[75] Inventors: James Fitzpatrick, Mountain View; Xiaodong Che, Sunnyvale, both of Calif.

[73] Assignee: Quantum Corporation, Milpitas, Calif.

[21] Appl. No.: 536,416

[22] Filed: Sep. 29, 1995

[51] Int. Cl.$^6$ ............................................. G11B 5/596
[52] U.S. Cl. ............................. 360/77.06; 360/65; 360/53
[58] Field of Search ............................. 360/46, 53, 65, 360/76, 77.08, 77.01, 77.05, 77.06

[56] References Cited

U.S. PATENT DOCUMENTS

| | | | |
|---|---|---|---|
| 4,802,033 | 1/1989 | Chi | 360/77.04 |
| 4,821,125 | 4/1989 | Christensen et al. | 360/46 X |
| 5,073,833 | 12/1991 | Best et al. | 360/77.05 |
| 5,235,478 | 8/1993 | Hoshimi et al. | 360/77.08 |
| 5,257,149 | 10/1993 | Meyer | 360/78.14 |
| 5,500,776 | 3/1996 | Smith | 360/77.08 X |
| 5,587,850 | 12/1996 | Ton-that | 360/77.08 |
| 5,606,469 | 2/1997 | Kosugi et al. | 360/77.05 |

*Primary Examiner*—Aristotelis M. Psitos
*Assistant Examiner*—Larry T. Cullen
*Attorney, Agent, or Firm*—David B. Harrison; Micah D. Stolowitz; Debra A. Chun

[57] ABSTRACT

Determining a micro-jog parameter in a disk drive that employs a magneto-resistive (MR) transducer head assembly and a partial response (PRML) detector includes improved accuracy in measuring on-track signal strength by use of a matched filter technique. The matched filter includes circuitry for emulating a partial response signal expected to be produced by a selected test bit pattern prerecorded on the selected track. The matched filtering technique provides improved accuracy in measuring the detected signal strength as it provides an extremely narrow digital filter focused on the test bit pattern frequency. Improved determination of the micro-jog distance further includes measuring interference from adjacent tracks, the best error rate being achieved at micro-jog positions intermediate the maximum on-track signal strength and the minimum off-track interference. A novel digital detector for accurately measuring adjacent track interference also is disclosed.

19 Claims, 8 Drawing Sheets

METHOD USING MATCHED FILTERS FOR DETERMINING HEAD POSITIONER MICRO-JOG IN HARD DISK DRIVE EMPLOYING MAGNETO-RESISTIVE HEADS

FIELD OF THE INVENTION

The present invention relates to digital data storage equipment and, more particularly, to improved methods and apparatus for determining a micro-jog parameter in a disk drive that employs a MR transducer assembly in combination with a digitally sampled type of read channel such as a PR4ML read channel, or a decision feedback equalization (DFE) read channel.

DESCRIPTION OF THE BACKGROUND ART

Data storage devices employing rotating magnetic or optical media disks are known for high capacity, low cost storage of digital data. Such disks typically contain a multiplicity of concentric data track locations, each capable of storing useful information. The information stored in each track is accessed by a transducer head assembly which is moved among the concentric tracks. Such an access process is typically bifurcated into two operations. First, a "track seek" operation is accomplished to position the transducer assembly generally over the track that contains the data to be recovered and, second, a "track following" operation maintains the transducer in precise alignment with the track as the data is read therefrom. Both these operations are also accomplished when data is to be written by the transducer head assembly to a specific track on the disk.

Physical positioning of the transducer head assembly is typically accomplished by a rotary actuator assembly which supports the transducer assembly at one end of the rotary actuator assembly. At the other end of the actuator assembly is an actuator motor, for example a voice coil motor, that causes the actuator assembly to pivot about a centrally located axis and move the transducer head assembly over the disk accordingly. Control circuitry controls the actuator motor such that the head assembly is accurately positioned amongst the concentric tracks on the disk. Typically, the actuator motor forms part of a continuously positionable system (servo system) that uses a closed loop servo circuit to control the position of the transducer assembly relative to the tracks on the disk. The servo system continuously adjusts the position of the actuator assembly based upon servo information read by the transducer assembly from the disk.

In high-capacity disk drives such as those disclosed in U.S. Pat. Nos. 5,235,478 and 5,073,833, transducer head assemblies typically contain two transducers, one for reading information from the disk and another for writing information to the disk. The read transducer is a magneto-resistive head and the write transducer is an inductive head. As is well-known in the art, a magneto-resistive head is much more sensitive to recorded magnetic flux transitions than an inductive head. As such, utilization of a magneto-resistive head enables the track density to be significantly increased over the track densities associated with disk drives that use inductive heads to both read and write data to the disk.

As for the physical arrangement of the heads, the two heads are typically linearly arranged upon a slider, one head behind the other, with a relatively small separation between the two heads. Alternatively, the centerlines of each of the two heads are laterally offset from one another by a relatively small distance. Such an offset can be utilized to minimize a radial distance that the actuator assembly must be displaced or "micro-jogged" between centerlines when switching from reading to writing, or from writing to reading operations, as explained below. The slider upon which the heads are mounted forms a portion of the transducer head assembly mounted to one end of the actuator assembly.

Generally, the head arrangement described above is known as a write-wide, read-narrow head arrangement. Specifically, the inductive write head is approximately three-fourths (¾) of a nominal track width (track pitch). On the other hand, the magneto-resistive read head is approximately 80% of the inductive write head width.

One disadvantage of using a transducer head assembly having two, spaced apart transducer heads on a rotary actuator assembly is that, as the transducer head assembly is positioned relative to the concentric tracks, a skew angle between the transducers heads becomes apparent. Specifically, if the transducer heads were perfectly aligned, one behind the other, over a given track near the outer diameter of a disk, as the transducer head assembly is moved toward the inner diameter of the disk, the transducer heads become "skewed" or misaligned relative to an underlying track. To compensate for this effect, the two heads are laterally offset from one another. As such, the two heads are typically aligned only at a selected radius intermediate the inside-diameter and outside diameter of the recording media, and become misaligned or skewed as the head assembly travels in either direction away from that selected radius. The resulting misalignment can be as much as +30% for an ensemble of heads at the inner diameter of the disk and −30% at the outer diameter of the disk.

To further compensate for the skew angle, special circuitry is used to coordinate the read and write functions during track seek and follow operations. During a seek operation, the read head is used to read embedded servo information recorded within each track on the disk. The servo information is recorded in one or more "servo sectors." This servo information informs the actuator control electronics of the specific track number the transducer head assembly is presently passing over and the relative alignment of the head with that particular data track.

Once the desired track is found, the servo information read by the read head is used within a closed loop servo controlling the actuator voice coil motor in order to move the actuator structure to minimize a position error signal (PES) and thereby accurately maintain the read head aligned with the center of the selected data track. The PES does not necessarily settle to zero. Rather, the servo moves the head to the desired track position, adjusted by the appropriate micro-jog distance. Thereafter, the read head can read the data present in one or more data segments that follow each servo sector during data reading operations.

As noted above, rotary actuators inherently cause a skew angle to be manifested between the head structure and the concentric data tracks, because the head is positioned along an arc, rather than along a straight radial line. In addition, with separate write and read elements arranged in tandem within the data transducer head structure, a further skew angle or offset between the write element and the read element may be present at any particular radial track location. If a data writing to disk operation is to be carried out at the data segment being followed by the read element within the track, the write gap will be offset from the track centerline by an amount related to the head skew, and the actuator assembly must be moved a distance, known as the "micro-jog distance", in order to bring the write head into alignment with the track centerline.

In this manner, when a servo sector is encountered at the beginning of a write operation, the read element reads the head position information from within a servo sector, and the servo control loop determines the micro-jog distance. The transducer head assembly is then micro-jogged to place the write element into alignment with track centerline before the writing operation is carried out. The micro-jog distance is determined during manufacture and stored in the disk drive. It may be determined for every track on the disk (or multiple disks), or at least for selected tracks at various radial locations.

U.S. Pat. No. 4,802,033 to Chi discloses methods and apparatus for measuring and recording the "track wise disparity" or micro-jog between inductive record and magneto-resistive read heads which are built on a common support for a disk drive system. According to that reference, some unspecified "test signal" is first recorded on a reference track. Beginning with the read head nominally positioned over the reference track, a microprocessor controller is used to determine the maximum playback signal strength using a trial and error algorithm. Specifically, the head position servo increments the head position, at a resolution of one-quarter track. At each new position, the microprocessor compares the detected signal strength to the previously recorded signal strength to determine whether there is an improvement or not. The head is moved by an additional increment in the direction of an improved signal strength, and moved back the other way if the detected signal strength decreased. In this fashion, the maximum detected signal strength location, within the one-quarter track resolution is detected, and this information is stored for later use as a bias or offset in controlling head positioning.

The '033 reference does not consider effects of noise in the playback electronics, and specifically does not consider the influence of data recorded on adjacent tracks while conducting the described "disparity self-calibrating routine". The nature of the signal strength detector is not specified, beyond the remark that it may be an envelope detector. A different approach to addressing the micro-jog problem is suggested in a more recent U.S. Pat. No. 5,257, 149 to Meyer. Meyer shows some detail of construction of a dual gap head and recognizes the head offset and skew problems. The solution proposed by Meyer is to provide two address fields for each data field on the media. A first address field is aligned with the read field on a data track, and is used during a read operation. The second address field is offset from the data track and is used during a write operation. Prior to writing data on the disk surface, a disk controller issues a "read the write address field" command. This causes the magnetic head to be offset so that the write address field is read. Since this address field is already offset from the data track, the write operation can proceed without further jogging of the magnetic head. While this approach may reduce delay associated with repositioning the magnetic head, it wastes a great deal of media area because of the requirement for duplicate address fields.

It is also known to determine a micro-jog distance between the read and write heads of an MR element by measuring the gain of the read channel automatic gain control loop as a function of lateral position. The position of minimum gain presumably corresponds to the maximum detected signal strength. However, accuracy is limited in this method as well because the signal strength, however measured, does not directly correspond to read/write head offset due to effects of noise—particularly adjacent track information—and nonlinearity in response of the read head as explained later. Moreover, the bandwidth of the filter used in estimating the amplitude of the detected signal is overly broad and allows noise into the estimate of the micro-jog parameter. The noise reduces the quality of the estimate. However, wide frequency range of the gain loop is necessary to allow rapid adaptation of the amplifier for arbitrary bit patterns during read operations.

Accordingly, the need remains for greater accuracy in determining offset or micro-jog distances.

SUMMARY OF THE INVENTION

In view of the foregoing background, it is an object of the present invention to improve accuracy in determining micro-jog distances in a disk drive.

A further object is to minimize the effects of adjacent track information in connection with determining micro-jog distances.

Another object of the invention is to provide a method of determining micro-jog distance that leverages existing components in a disk drive.

Another object is to provide an improved disk drive with improved micro-jog accuracy while minimizing cost of the disk drive.

Still a further object of the invention is to improve noise filtering for determining a micro-jog distance so as to minimize effects of adjacent track information without compromising read channel speed.

One aspect of the invention is a method of determining a micro-jog distance for a selected track on a disk drive recording media. The new method calls for determining a first offset distance from the selected track nominal centerline where on-track read signal energy is maximized; next, determining a second offset distance from the selected track nominal centerline where adjacent track read signal interference energy is minimized; and then selecting a third offset distance intermediate the first and second offset distances as the micro-jog distance for the selected track. Preferably, the best error rate is at the offset location where a ratio of maximum on-track signal to off-track interference is maximized.

Another aspect of the invention is a method of determining micro-jog in a disk drive that includes matched filtering of a detected signal relative to a test signal pre-recorded in a selected track to accurately determine signal amplitude.

Another aspect of the invention includes recording a selected test bit pattern onto a selected track to serve as micro-jog data samples. The method further includes: coupling a digitally sampled detector to the disk drive playback element to receive a first series of signals responsive to the stored bit pattern; equalizing the first series of signals; and filtering the equalized signals so as to form a matched filter output signal indicative of the MR head micro-jog. In one embodiment, the playback signal forms a PR4 partial response series of samples. In another embodiment, the playback signal forms an EPR4 (extended PR4) partial response series of samples. The invention can also be used with a DFE read channel.

The foregoing and other objects, features and advantages of the invention will become more readily apparent from the following detailed description of a preferred embodiment which proceeds with reference to the drawings.

BRIEF DESCRIPTION OF THE DRAWINGS

To facilitate understanding, like reference numerals have been used, where possible, to designate identical elements that are common to multiple figures.

DETAILED DESCRIPTION OF THE PREFERRED EMBODIMENT

The first several figures illustrate typical disk drive apparatus and will be described relatively briefly to convey the context of the present invention and explain those aspects of existing disk drives that are pertinent to understanding and using the present invention. As will be shown, the present invention includes circuitry that can be incorporated into, and works in cooperation with, existing disk drive apparatus.

MR Disk Drive Overview

Figure 1:
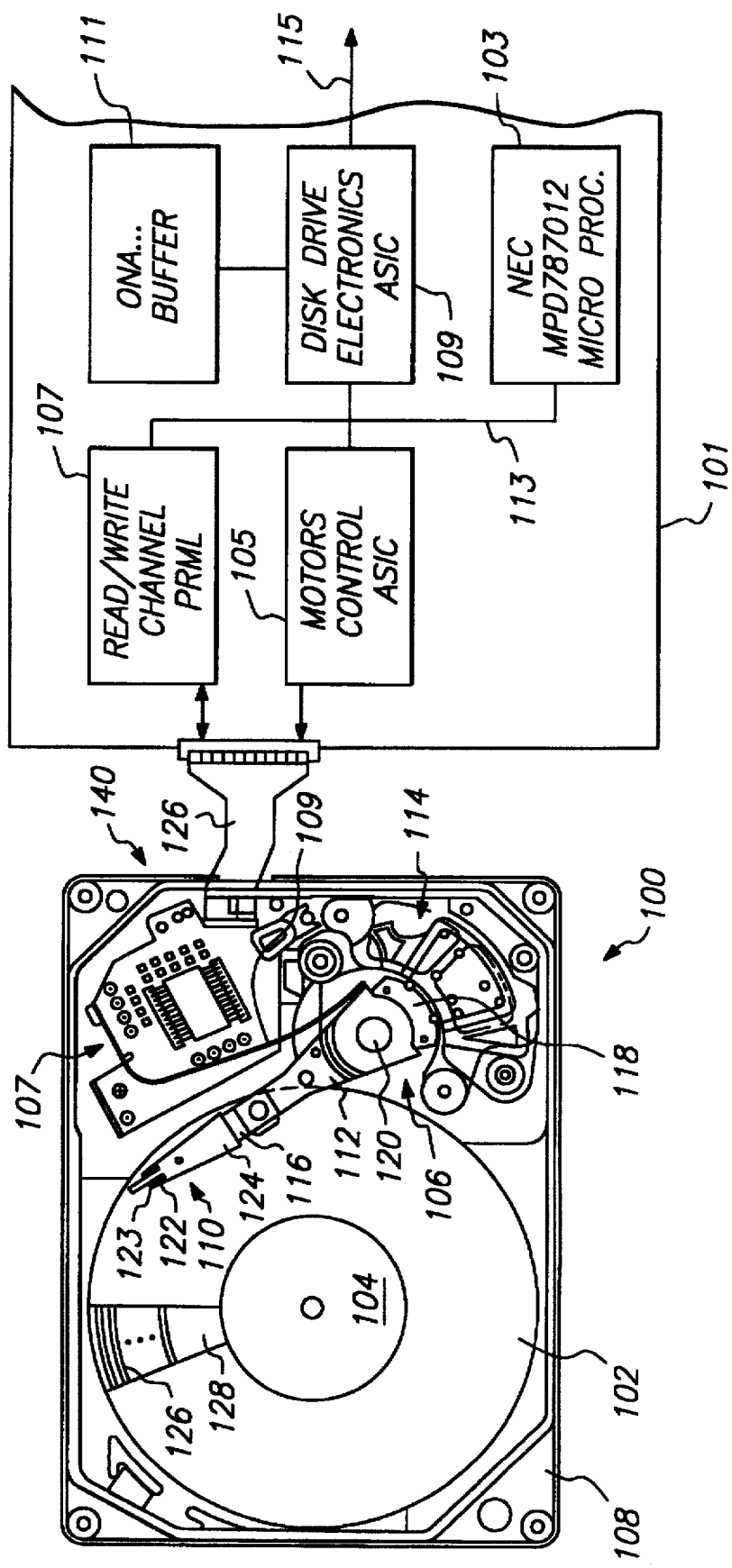
FIG. 1 depicts a top plan view of a disk drive head and disk assembly (HDA) and a simplified block diagram of disk drive electronics including a read/write channel used in carrying out the present invention.

FIG. 1 depicts a top plan view of a disk head and disk assembly (HDA) 100 and circuit board 101. Only the principle aspects of each of these will be described for present purposes. The disk drive HDA 100 contains a rotatable magnetic storage disk 102, spindle motor (not shown) for rotating the disk, a hub 104 and a rotary voice coil actuator assembly 106. Read/write circuitry, preamplifiers, etc. are contained in circuit 107, which is connected to the rotary actuator by a flex circuit 126 enabling the HDA 100 to be connected to a disk drive electronics circuit board 101 via a cable 126. For simplicity, the present discussion mentions only a single storage disk in the disk drive, although those skilled in the art will recognize that the present invention can be used in disk drives having multiple disks mounted on a common spindle. Typically, the storage disk 102 is coated with a magnetic material that stores data in the form of longitudinal bipolar magnetic patterns written by digital saturation recording techniques within each concentric data track, for example track 126.

Actuator assembly 106 conventionally comprises a transducer head assembly 110 for each data surface, a carriage assembly 112, and a rotary voice coil actuator motor 114. In the rotary-type actuator assembly 106, the transducer head gimbal assembly 110 is attached to an outer end 116 of the carriage 112 while the actuator motor voice coil 114 is attached at a hub end 118 of the carriage. Selective activation of the actuator voice coil motor rotates the actuator assembly 106 about a pivot for positioning of the transducer assembly 110 over the surface of the storage disk 102. This allows data to be written to, and read from, each data storage surface disk 102 by transducers disposed in the transducer assembly 110 as described in greater detail below.

The disk drive electronics 101 generally comprises the following major components. The read/write channel electronics 107 is discussed in greater detail below. A motor controls ASIC 105, disk drive electronics ASIC 109, DRAM buffer 111 and microprocessor 103 provide functions which will be adequately familiar to those skilled in the art for present purposes. The methods and apparatus of the present invention related to determining micro-jog distances, preferably are implemented in connection with the read/write channel 107 and microprocessor 103 as will be explained.

Magneto-resistive Transducer

Figures 2, 3:
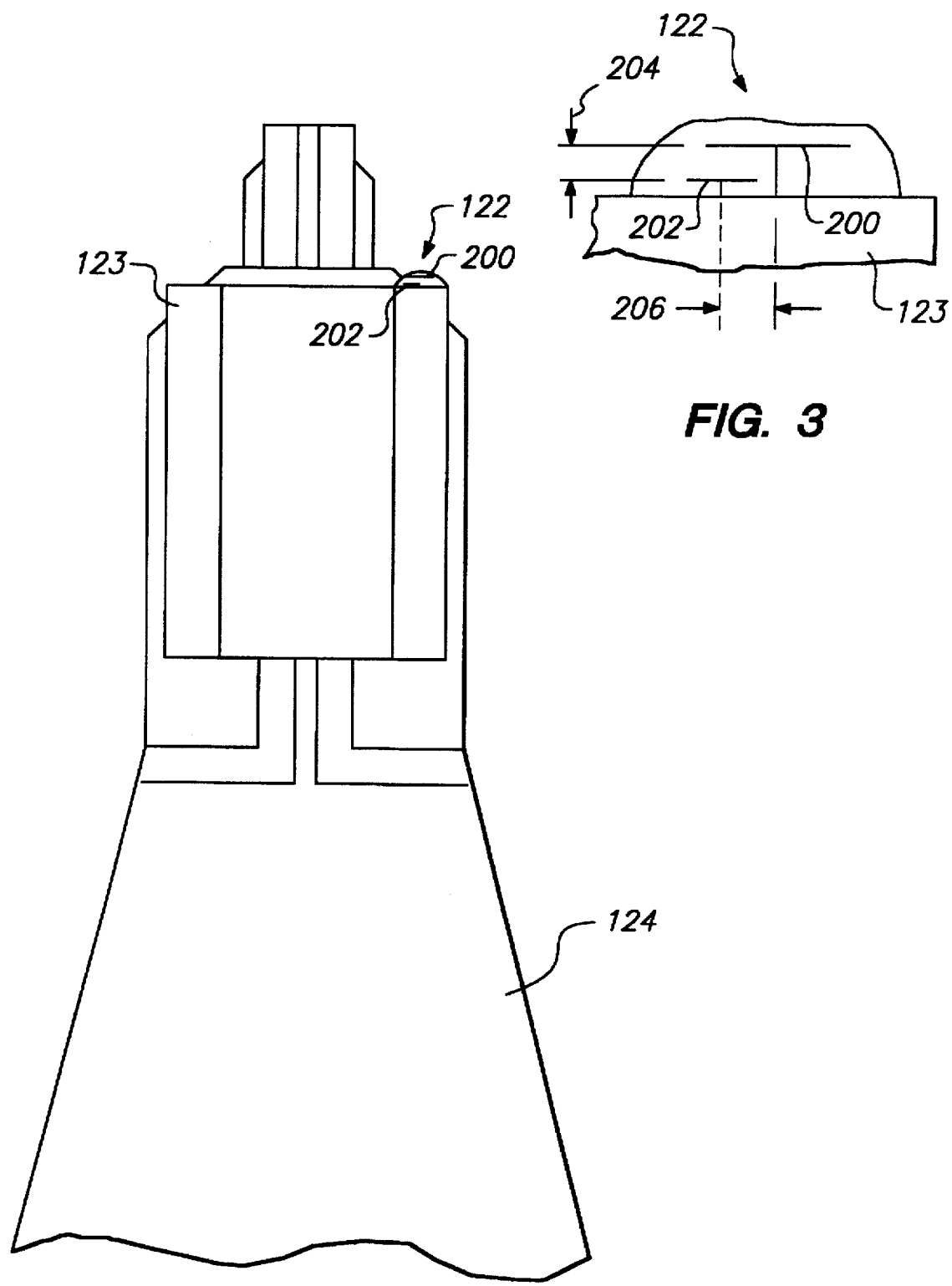
FIG. 2 is a simplified schematic diagram of a head-gimbal assembly of the FIG. 1 HDA including a transducer assembly comprising a write-wide inductive thin film head and a read-narrow magneto resistive (MR) read element.
FIG. 3 is a simplified enlarged view of the head transducer assembly.

FIG. 2 shows the head-gimbal assembly of the FIG. 1 HDA in greater detail. Typically, the head-gimbal assembly 110 includes a dual head transducer assembly 122 including a thin film inductive write head 200 and a shielded magneto resistive thin film read head 202. As noted, the effective width of the write element is wider than the effective width of the MR read element, in what is known in the art as a "write wide, read narrow" configuration. Referring to FIG. 3, the figure illustrates how the read element 202 is longitudinally offset from the write element 200 and, because of radial skew imposed by the rotary actuator as explained above, the effective center lines of the write and read elements are offset as well. In FIG. 3, the offset between the read and write head nominal center lines is illustrated by 206. This offset is in the lateral or cross track direction. The in-line or in-track offset between the heads is illustrated by 204. These misalignments are better understood with reference to the actual construction of the dual-head transducer assembly.

Figure 4:
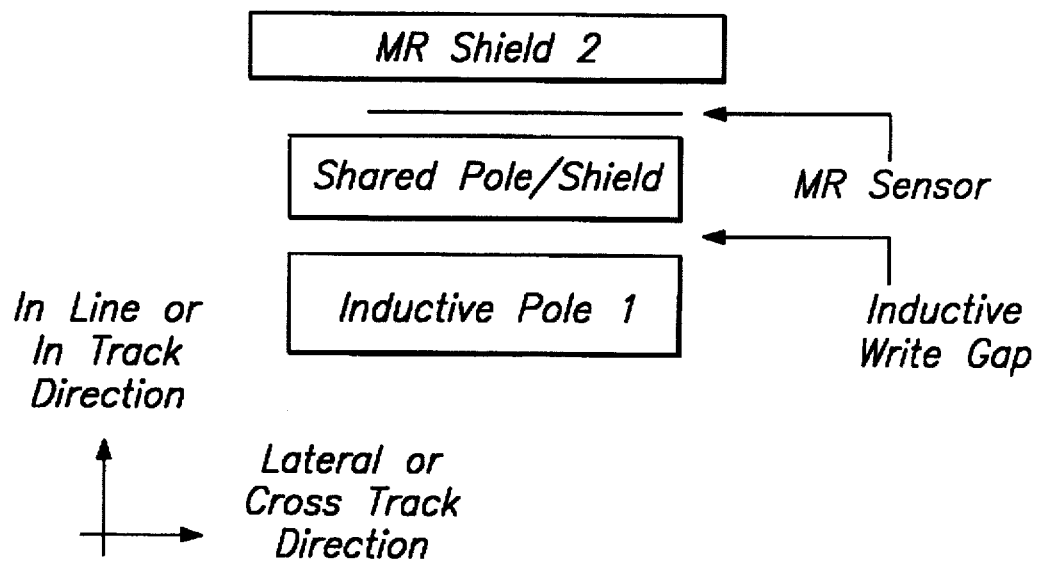
FIG. 4 is a diagram illustrating the magneto-resistive recording head viewed from the disk towards the head.
Figure 5:
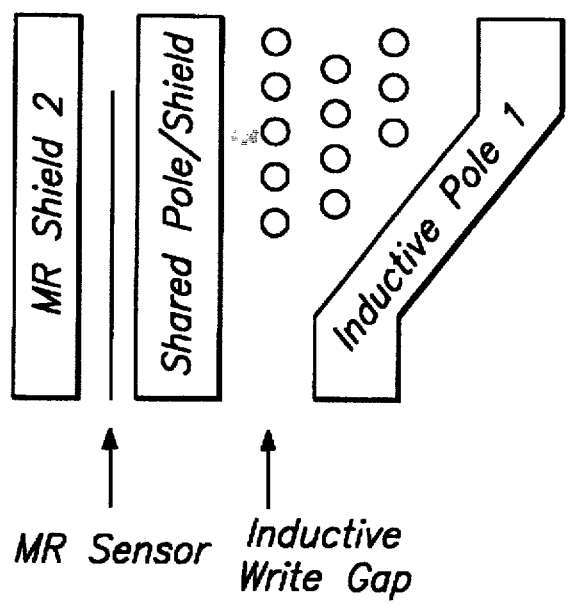
FIG. 5 is a simplified side view of the MR recording head.

FIG. 4 illustrates the transducer assembly as viewed from the disk towards the head. Here, the magneto resistive sensor 202 extends along an MR shield 300. A shared pole/shield 302 extends alongside the MR sensor on a side opposite MR shield 300. The inductive write gap 200 is defined by a gap in between the shared pole 302 and an inductive pole 304. FIG. 5 illustrates the same MR recording head in cross-section. Here, in addition to the elements described above, one can see the inductor winding, for example 306, shown in cross section.

Figure 6:
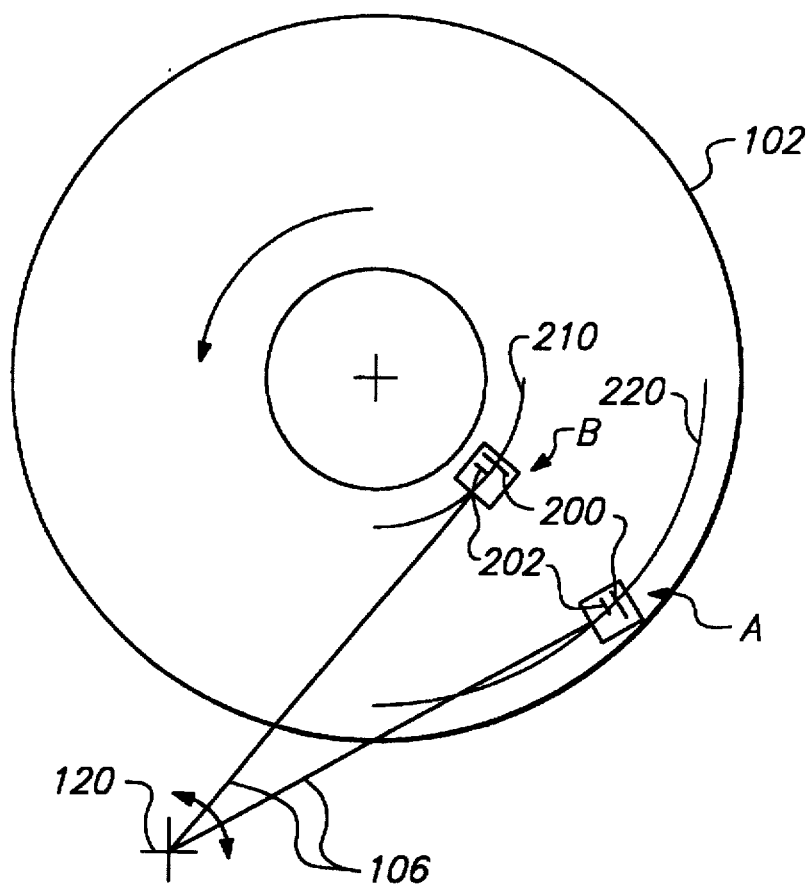
FIG. 6 depicts the transducer head assembly at two different radial positions in a top view of the recording disk surface.

FIG. 6 illustrates the positioning of the transducer assembly relative to the disk 102 in use. When the rotary actuator assembly positions the transducer assembly over a first track having nominal track center line 220, it may be observed that both the read and write elements are approximately centered, at least physically, over the track center line. However, in a second position adjacent track 210, it may be observed that the positioning of the heads relative to the nominal track center line 210 is changed due to the variation in skew angle.

Figure 7:
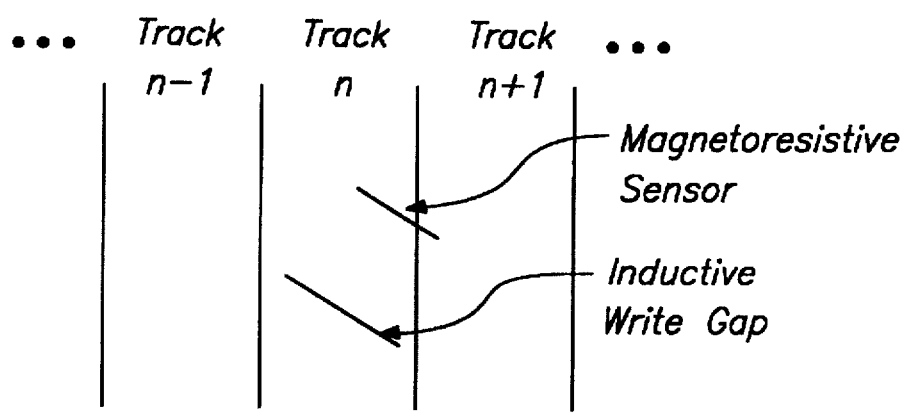
FIG. 7 is a diagram illustrating relative position and orientation of the MR read sensor and the inductive write gap over several adjacent tracks.

FIG. 7 illustrates in greater detail an example of positioning of the inductive write gap 200 and MR sensor 202 relative to track 126 and adjacent tracks to either side of it. In FIG. 7, the center line of the write gap is centered within track 126. Due to in-line separation, skew angle and lateral misalignment, the MR read element is offset from the nominal track position.

Figure 8:
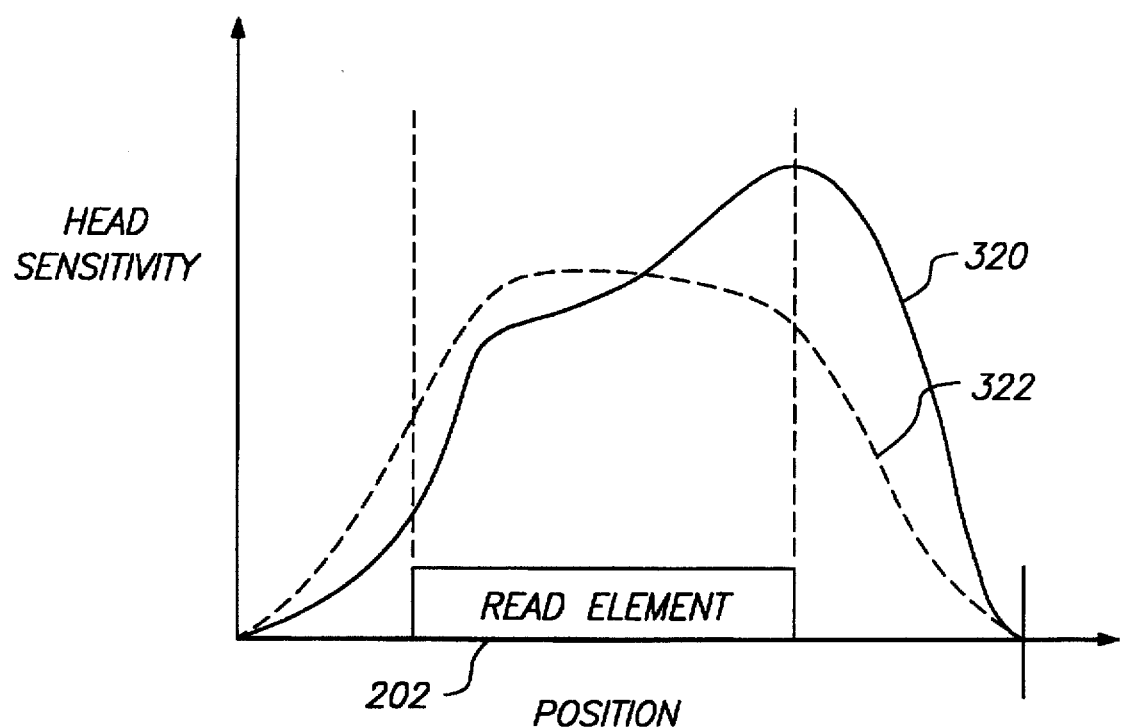
FIG. 8 is a graph illustrating head sensitivity versus lateral position for the dual transducer head assembly.

The read element misalignment often is further exacerbated due to nonlinearities in it's sensitivity. FIG. 8 is a graph illustrating head sensitivity versus position for a magneto resistive head. Here, a curve 320 illustrates one example of head sensitivity characteristic curve, while dashed line 322 illustrates a head sensitivity characteristic curve for a different head. As suggested by the illustration, the sensitivity varies from one head to another due to limitations in controlling the head manufacturing process. The sensitivity not only varies from one head to another, but is at times nonlinear. In any event, it cannot be assumed that the magnetic center, i.e., the center of the head sensitivity, is the same as its physical center. For all of these reasons, a micro-jog distance must be determined individually for each and every disk drive and for each and every MR head in the drive. Additionally, because of the variations in skew angle, the micro-jog distance must be determined for different radial zones of the disk. Ideally, an exact micro-jog could be determined for each and every track. In practice, a typical disk is logically partitioned into say, 16 radial zones to maintain roughly constant areal density. Micro-jog preferably is determined in each of say, four of the radial zones with interpolation used for the intermediate zones. The present invention is directed to methods and apparatus for accurately determining the micro-jog distance.

Figure 9:
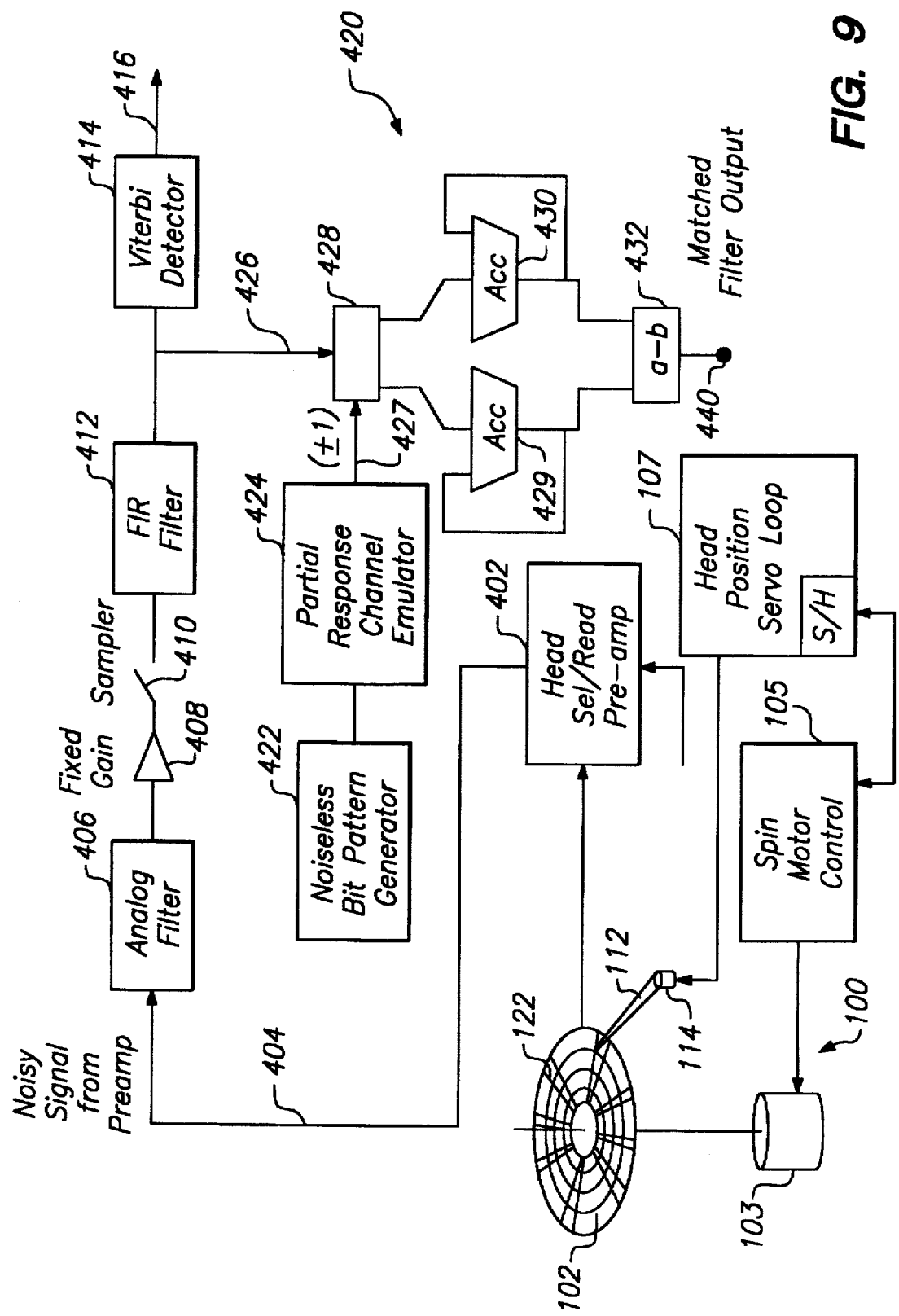
FIG. 9 is a simplified block diagram of circuitry for determining a micro-jog distance using matched filtering according to the present invention.

FIG. 9 is a block diagram of selected portions of a disk drive illustrating one aspect of the present invention in a presently preferred embodiment. The disk drive head and disk assembly HDA 100 includes motor 103 controlled by spin motor control 105 to provide a constant rotational speed of the recording disk 102 as is conventional. A head position servo loop 107 controls the rotary voice coil actuator motor 114 for rotating carriage 112 so as to controllably position the transducer head assembly 122 as appropriate. The transducer head assembly is coupled to a head select/read channel preamplifier 402. The head select/read channel preamplifier is preferably included within the HDA 100 in close proximity to the MR heads to reduce noise pickup. Conventionally, the preamp 402 is connected by a thin flexible plastic printed circuit substrate.

The Read Channel

To understand operation of the read channel as it pertains to the present invention, it is useful to first briefly review how data is written onto the disk in general. An input data path (not shown) includes encoder/decoder circuitry which converts the input digital byte stream into coded data sequences in accordance with a predetermined data coding format, such as (0,4/4) modulation code. This coded serial data stream is then delivered to a precoder (not shown) which precodes the data in accordance with, for example, the partial response class four (PR4) precoding algorithm. The resulting data is then passed through write precompensation circuitry, write driver circuits, and finally delivered to the selected data transducer head. The inductive head 200 writes the data as a pattern of alternating flux transitions within a selected data track.

Returning to FIG. 9, during playback, flux transitions sensed by the transducer head as it flies over the selected data track are preamplified by the read preamplifier circuit 402. This preamplified analog signal or "read signal" is transmitted on a path 404 through one or more analog amplifiers (not shown) to a programmable analog filter/equalizer 406. The analog filter/equalizer 406 is programmed so that it is optimized for the data transfer rate of the radial zone from within which the head is currently reading data. The equalized analog read signal is then passed through an amplifier 408, which may include one or more fixed gain and/or variable gain amplifiers. These components and their operation are described in greater detail in commonly-assigned U.S. Pat. No. 5,345,342 incorporated herein by this reference.

The equalized analog read signal is then sampled and quantitized in a high-speed flash analog-to-digital (A/D) converter 410 which, when synchronized to user data, generates raw data samples. The raw data samples in turn are input to a FIR filter 412 which, for a normal read operation, employs adaptive filter coefficients for filtering and conditioning the raw data samples in accordance with the desired (e.g. PR4) channel response characteristics. The band pass filtered and conditioned data sample leaving the FIR filter, node 426, are input to a Viterbi detector 414 which detects the data stream, based upon the Viterbi "maximum likelihood detector" algorithm. The resulting decoded data is provided on a path 416 in accordance with a predetermined coding convention for further processing to restore the original coding convention to the decoded data. The restored coded data stream is decoded from the (0,4/4) code and deserialized, etc., and passed into a sequencer (not shown) for output. Greater detail of operation of the read channel for reading stored data is described in the aforementioned '342 patent.

The foregoing discussion summarized operation of the PRML read channel during a read operation to recover user data when the disk drive is in actual use. Next we describe methods and apparatus for determining micro-jog distances which take advantage of selected portions of the read channel electronics. Micro-jog distances generally are estimated and recorded in the disk drive after it is assembled but before it leaves the factory. This is done as part of an initialization and optimization procedure that includes, for example, selecting and storing read channel FIR filter coefficients for each zone of the disk. At the time of determining micro-jog distances, the read channel electronics are in place and functioning.

Estimated the Micro-Jog Parameter Using Matched Filtering

As noted in the background, it is known to estimate an offset between the read and write elements by using the gain loop of the detector channel. In other words, one assumes that the read signal amplitude is inversely proportional to the gain level in the adjustable gain loop of the read channel. By measuring the amplitude of the read signal as a function of offset position, one can determine the offset which yields the largest playback signal and hence the micro-jog of the current track. We have determined that one drawback of this prior art approach is that the bandwidth of the filter used in estimating the amplitude of the signal is overly broad and injects noise into the estimate of the micro-jog parameter thereby lowering the quality of that estimate.

According to one aspect of the present invention, a selected bit pattern called a "test bit pattern" is first written onto the disk. The read signal arising from the test bit pattern during a read operation is detected using a partial response detector with the automatic gain loop disabled (i.e., set to a fixed nominal value) and with the FIR filter in static mode. The equalized samples are then matched filtered by multiplying each sample by the nominal value one anticipates for that sample and accumulating the results as further described below. The circuitry used for detecting the test bit sequence in connection with estimating micro-jog is distinct from and should not be confused with the usual read channel FIR filter, 412 in FIG. 9. Various bit patterns can be prerecorded to provide the test bit sequence.

In the presently preferred embodiment, the test bit pattern is a square-wave, i.e., a 11001100 bit sequence. The square-wave pattern was selected for maximum energy out of the PR filter. This is not necessarily the optimum pattern to use in all applications.

Referring again to FIG. 9, a "noiseless bit pattern generator" 422 provides a bit stream repeating the test bit pattern. The bit pattern generator can be implemented in various ways as will be apparent to those skilled in the art in view of this disclosure. For example, a square-wave generator can be conveniently implemented in a digital IC as a loop of flip-flop circuits, or the selected test bit pattern can be stored in ROM, etc. However implemented, it may be convenient to use the same noiseless bit pattern generator to provide the input data stream for recording the test bit pattern on the disk.

The following description of the new method of estimating micro-jog assumes that the selected test bit pattern has been previously stored on the disk, and that the disk drive is now operating in a read operation of the track and sector where the test bit pattern resides. Accordingly, a read signal responsive to the test bit pattern traverses the read channel 402, 404, 406, 408, 410, 412 as described above, resulting in a stream of band pass filtered and conditioned data samples leaving the FIR filter 412 at node 426. These are the "noisy samples." At the same time, and synchronized with that data stream, the bit pattern generator 422 continuously provides the test bit pattern to a Partial response channel emulator circuit 424. The partial response (PR) emulator is designed to receive an input bit stream and determine the noiseless samples one would expect from the actual PR channel that the detector is intended to emulate—namely the PR channel in the disk drive being examined. For example, in a partial response class 4 system, the emulator 424 would subtract the present bit $b_K$ from the bit 2 bit-intervals prior in time, $b_{K-2}$. Preferably, the emulator comprises a relatively small FIR filter, since only two memory units are required for a PR4 emulator, or four memory units for an extended PR4 emulator. Details of implementing FIR filters are known. In an alternative embodiment, the functions of the bit pattern generator 422 and partial response channel emulator 424 can be combined and replaced by simply storing the expected noiseless samples associated with the recorded test bit pattern.

In either case, matched filtering of the read signal preferably is implemented as follows. The noisy samples are provided over path 426 to a demux circuit 428. The noiseless samples (±1) are input over path 427 to control demux 428. When the noiseless sample value is +1, the demux directs the noisy sample to a first accumulator 429. Conversely, when the noiseless sample value is −1, the demux directs the noisy sample to a second accumulator 430. Each accumulator sums the respective values provided to it, and provides the results to a subtractor circuit 432. Circuit 432 is arranged to subtract the sum of the −1 terms from the sum of the +1 terms to form the matched filter output at node 440. In an alternative embodiment (not illustrated), a multiplier circuit can be used to multiply each noiseless sample times the corresponding noisy sample, and the resulting products are accumulated over the test bit pattern. However, the preferred embodiment described above is simpler to implement. Either way, the magnitude of the matched filter output indicates an average amplitude of the detected test signal over the length of the test bit pattern. By repeatedly measuring signal amplitude for different offset positions, it is possible to locate an offset corresponding to the largest signal energy and hence the micro-jog of the subject track. The same process can be repeated for all or selected tracks over the disk surface.

The foregoing circuitry and methodology for estimating micro-jog has the following advantages over prior art. First, the result of the matched filter approach has reduced variance and produces a more accurate estimate of micro-jog than is possible with an adaptive loop approach. Second, the disclosed circuitry is relatively simple to implement. Third, this matched filter technique can be applied to any digitally sampled detector system. Fourth, the present methods and apparatus can be applied to arbitrary test bit patterns. This can be advantageous since the micro-jog of a head in some cases is influenced by the recorded bit pattern. The multiplier 428 is easy to implement for PR4 or EPR4 partial response systems since it need only multiply the noisy samples by +2, −2, +1, −1, and 0: Implementation of these operations is straightforward in digital systems using bit shifting, two's-complement arithmetic, etc. as is well known.

Minimizing Cross-Track Interference

Another aspect of the present invention employs methods and apparatus for estimating the micro-jog parameter by determining a lateral position over a given track that minimizes interference from adjacent tracks. This is distinguished from other methodologies in which the on-track signal strength is maximized. As described above, MR playback elements are generally non-linear and frequently are sensitive to adjacent track information. Moreover, for an MR head, the lateral or cross-track position with maximum on-track signal response does not necessarily correspond to the cross-track position with minimum interference of adjacent tracks. By measuring cross-track interference as a function of the lateral head position, one can determine the position with minimum interference. Combining this information with information about on-track signal strength, one can determine the cross-track position with a maximum ratio of on-track signal strength to off-track interference. We have found that this position generally offers the best bit error rate performance, as illustrated later.

The challenge is to provide an accurate method of measuring cross-track interference without undue cost or complication. Such a measurement must be relatively immune to on-track data "interference". In other words, it is important to isolate the off-track interference to accurately measure it. According to the invention, a cross-track interference measurement procedure begins by writing carefully selected data onto two "interference tracks" on the disk, i.e. onto lateral positions offset to each side of a selected nominal track center. These offset locations are not literally "tracks" in the sense that they are not located a full track pitch offset from the selected nominal track center. Rather, they are offset by a smaller lateral distance, e.g. some fraction of a track pitch. We refer to this selected data as an "interference bit pattern." Then a higher frequency test bit pattern is written onto the nominal track center to form on-track data.

Figure 10:
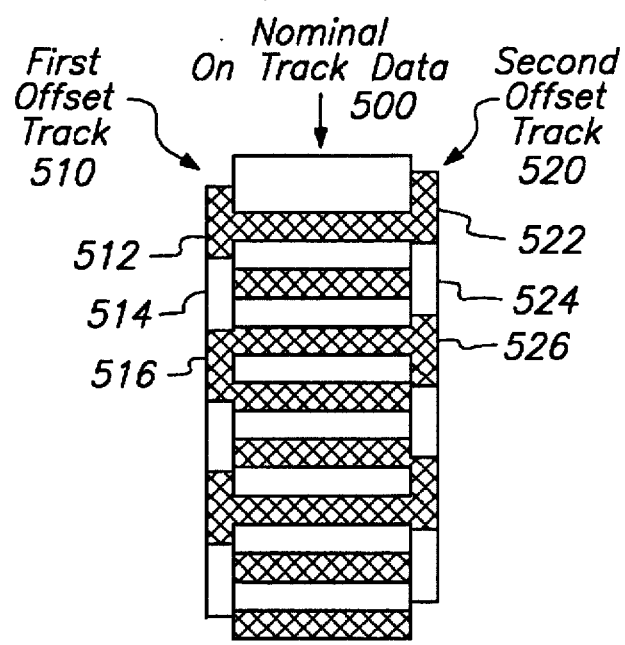
FIG. 10 is a simplified illustration of magnetization patterns on a disk drive recording media useful in measuring adjacent track interference.

FIG. 10 is a simplified diagram illustrating magnetization patterns resulting from recording the described data about a selected track 500. The low-frequency interference bit pattern is recorded on a first offset position 510. In the first offset position, the hatched rectangles, for example 512, 516, represent media magnetized in the opposite direction from the white rectangles, for example 514. The low frequency interference bit pattern also is written on a second offset position 520 (again, the hatched rectangles 522, 526 represent media magnetized in the opposite direction from the white rectangles, e.g., 524). The two interference bit patterns are recorded a fraction of the track pitch, e.g. one-fourth or one-eighth track pitch, offset from the center line of the nominal track 500. Then the on-track data, preferably a square-wave pattern, is written at the nominal track center-line.

In the presently preferred embodiment, the on-track data as well as the interference bit patterns each consists of a square-wave. The period of each square-wave should be equal to an integer multiple of bit periods. For example, the period of the low frequency interference bit patterns is 8T, where T is the duration of a single encoded bit. The on-track high-frequency, square-wave data has a period of 4T. It is not necessary and no attempt need be made to write the three positions with phase coherence (i.e., with transitions aligned). Details of writing the test bit patterns to the media as described will be apparent to those skilled in the art.

Figure 11:
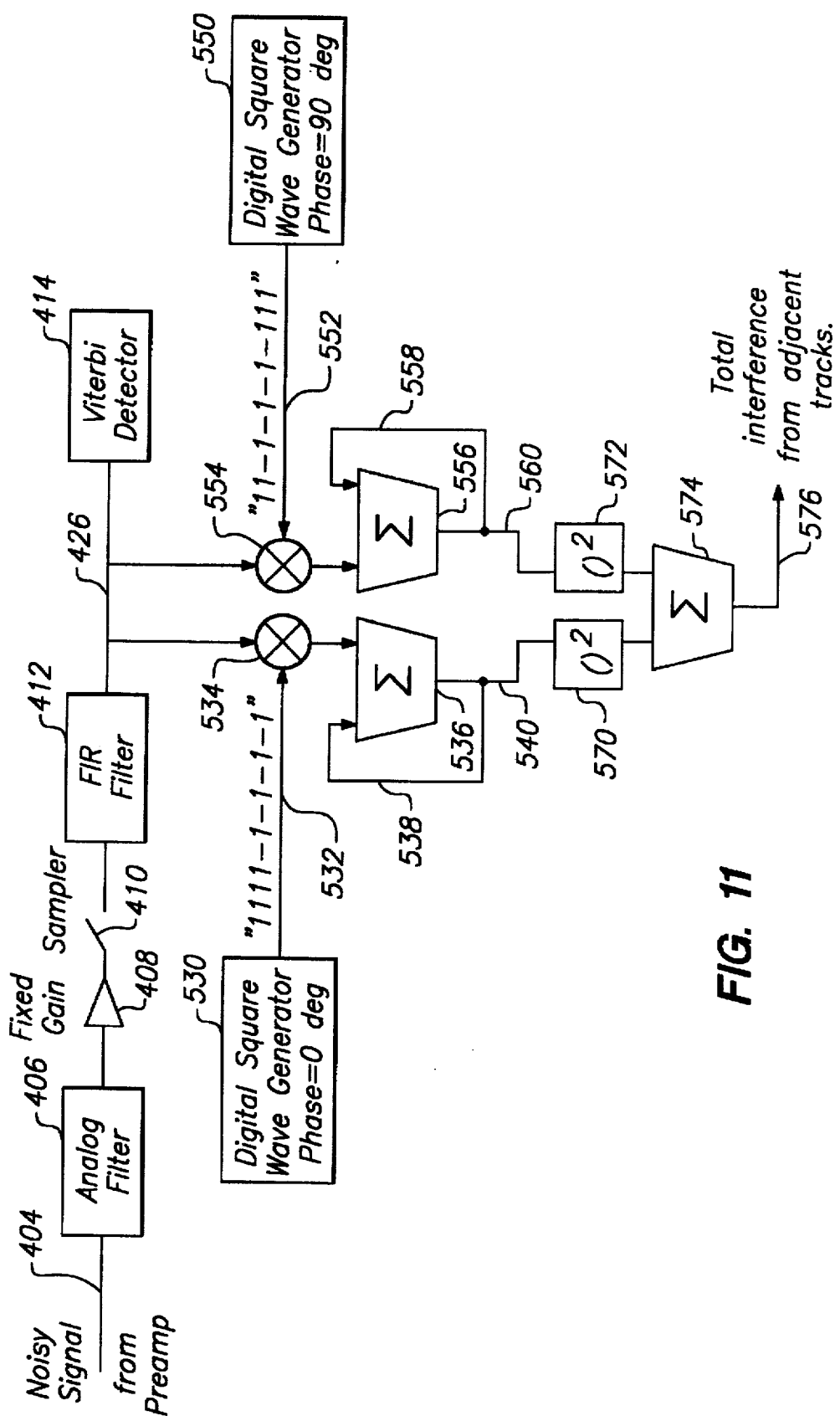
FIG. 11 is a block diagram illustrating circuitry for measuring adjacent track interference in a disk drive.

Next we turn to reading this specially recorded data in order to determine the influence of the off-track interference data as a function of lateral head position. FIG. 11 is a simplified block diagram of a digital detector and circuitry for measuring cross-track interference. Conventional read channel electronics, in simplified form, comprises the analog filter 406, amplifier 408, A/D converter 410, FIR filter 412 and Viterbi detector 414 described above.

In operation, for determining cross-track interference, the MR read head repeatedly reads the data described above (500, 510, 520 in FIG. 10) from various cross-track positions and measures the amount of on-track signal and cross-track interference. During each pass over the track, the digital detector synchronizes to the data on the nominal track and reads the resulting signal with its gain loop disabled. The resulting digital samples are passed to two correlation circuits described below to correlate the read waveform with the in-phase and quadrature phase digital low frequency squarewaves. These squarewave correlators form a narrow band filter having pass bands at odd harmonics of the signal recorded on the interference tracks. Since the nominal or central track is written at a different frequency from the interference data, its response is orthogonal to that of the offset (interference) tracks (except for even harmonic distortions introduced by head non-linearities) and thus has little impact on the interference measurement.

Referring to FIG. 11, the read signal 404 passes through an analog filter 406 and the resulting signal is input to a fixed-gain amplifier 408. The resulting signal is synchronously sampled in an A/D converter 410. The discrete samples are input to a finite impulse response (FIR) filter 412. The read circuitry described equalizes the read signals so as to form partial response samples at node 426. It is important that the FIR filter not operate adaptive mode during the micro-jog calculation. The equalized samples are then correlated with two digital squarewaves with frequency equal to the frequency of the interference bit patterns written to either side of the nominal track as described above (see FIG. 10).

The correlation can be measured as follows. Each period of the digital squarewaves are composed of a series of +1s followed by an equal number of −1s. A first digital squarewave generator 530 provides such a series of bits at path 532, A second digital squarewave generator 550 provides a like series of bits at path 552 but 90 degrees out of phase from the first digital squarewave generator 530. Thus, if the period of each squarewave is 4NT, where N is an integer and T is a period of a bit, then one squarewave begins with 2N +1/s and the other starts with N +1/s. The equalized read signal samples at node 426 are synchronously multiplied by the first digital squarewave (node 532) and a first multiplier circuit 534. The product is input to an adder 536 which includes a feedback path 538 for accumulating the sum of the products at node 540. The accumulated sum of the products is squared in first squaring circuit 570 and the result input to a third adder circuit 574.

Similarly, the equalized read samples from node 426 are synchronously multiplied by the second digital squarewave in a second multiplier 554. A second adder 556 receives the products from multiplier 554 and accumulates them via feedback path 558 so that the sum of the products is output at node 560. (Alternatively, the correlation can be measured for each interference track using a demux and accumulator circuits as described above with reference to FIG. 9.). The sum of these products is squared in second squaring circuit 572 and the result input to adder 574 so that the sum of the squares of the accumulated sums appears at output node 576. The number appearing at node 576 provides an indication of the amount of low frequency power resulting from the current offset position of the head. While it is mathematically precise to square the accumulated sum before adding the two together, simply taking their absolute value before adding yields a simplified, although slightly degraded estimate of the interference from the interference bit patterns.

The on-track signal amplitude can be measured at the same time that interference is being measured versus lateral head position. For example, the on-track signal can be measured using the matched filter circuitry and techniques described above. To do so, the matched filtering circuitry of FIG. 9 is implemented together with the cross-track interference measurement circuitry of FIG. 11. Both circuits receive sample data from the read track FIR filter at node 426. In the presently preferred embodiment, all of the described circuitry is implemented on-chip with existing drive electronics. Alternatively, one of the correlation circuits of FIG. 11 could be used for the on-track measurement at a different time. We have found that the optimal micro-jog is determined by selecting a head position near a maximum of a ratio of the on-track signal energy to off-track interference. Performance of the interference measuring circuitry is best if the central track frequency is selected to be an even multiple of the low frequency interference track data since all harmonics of the side tracks will be orthogonal harmonics of the central track. The on-track measurement data from the matched filter output at 440 as well as the interference provided at node 576 can be conveniently buffered in memory for processing and comparison versus lateral position using the microprocessor 103 of FIG. 1 under suitable software control.

This aspect of the invention has several desirable advantages. First, the circuitry described for implementing the interference detector is simple to implement because it relies upon multiplying the incoming signals by +1 or −1 (for PR4) and thus does not require any floating point precision. Since the interference detector measures both the in-phase and quadrature components of the adjacent track interference, precise phase coherence between these tracks and the recovered clock is not essential.

The circuitry described herein can be conveniently implemented into many existing disk drive designs with relatively modest modifications and at little cost. It is also possible to employ the present methods and apparatus in separate test equipment arranged for determining micro-jog parameters during the disk drive manufacturing process. Separate test equipment may be advantageous, for example, where extremely miniaturized disk drive designs present obstacles to even incremental increases in on-chip circuitry.

Test/emulation Results

Figure 12:
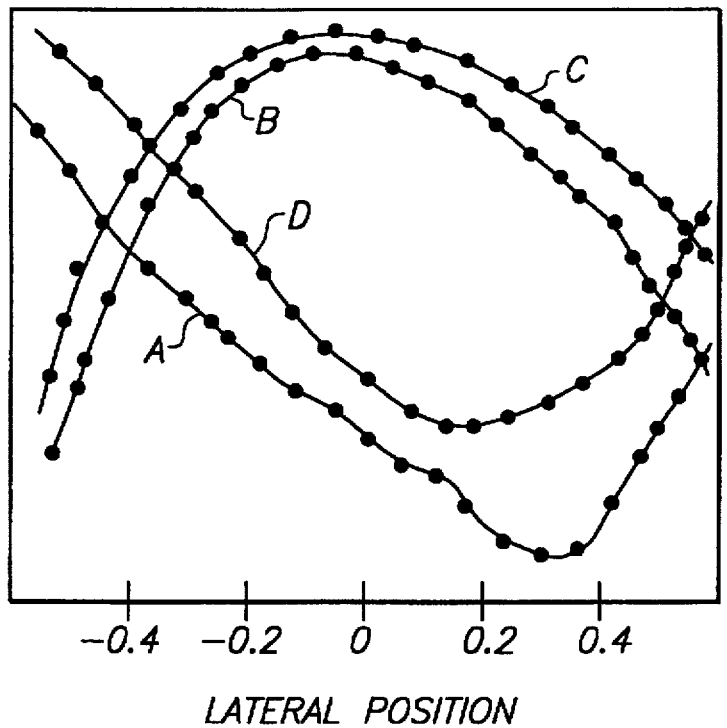
FIG. 12 is an illustrative plot of on-track signal amplitudes, adjacent track interference and error rate as a function of lateral or cross-track position.

FIG. 12 is a track profile plot illustrating simulation of the methods and circuitry described above. In FIG. 12, plot A illustrates the cross-track interference of two low frequency interference tracks written on a disk as described above, and measured using an analog band-pass filter with center frequency equal to the first harmonic of the recorded signal, to emulate the preferred digital detector. The horizontal scale indicates lateral position expressed in offset from the nominal written track position (in microns). The interference track test bit pattern may have a frequency, for example, on the order of 8 MHz.

Plot B illustrates on-track signal amplitude for an isolated track, while plot C illustrates on-track signal amplitude with two old data tracks written at ±2.0 micrometers. It should be noted that different vertical scales are used for each plot. Finally, curve D is a plot of bit error rate. Note that the best bit error rate occurs in between the two extrema of on-track signal maximum and interference track signal minimum, the best error rate occurring in this illustration at approximately +0.2 microns. These test results confirm that the conventional wisdom which assumes that the greatest signal to noise ratio will be found where the on-track signal is maximized is erroneous. The present invention can be implemented with minimal costs while achieving substantial improvements in disk drive performance.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. In a disk drive having a magneto-resistive read, inductive write transducer (MR) head assembly and a sampled digital detector read channel, a method of estimating a micro-jog distance for a selected track on the disk drive recording media, the selected track having a nominal centerline location, the method comprising the steps of:

determining a first offset distance from the selected track nominal centerline where on-track read signal energy is maximized;

determining a second offset distance from the selected track nominal centerline comprising the step of:
  selecting an interference bit pattern having a first frequency;
  recording the interference bit pattern in each of two selected interference locations on the recording media, each of the interference locations being laterally offset to a respective side of the nominal track centerline by a selected distance less than the track pitch;
  reading the selected track at a plurality of various offset distances from the nominal centerline location;
  measuring a read signal energy responsive to the interference bit patterns at each of said various offset distances; and
  selecting one of said various offset distances as the second offset distance for the selected track so as to position the head assembly where the detected read signal energy responsive to the interference bit patterns is minimized; and selecting a third offset distance intermediate the first and second offset distances as the micro-jog distance for the selected track.

2. A method according to claim 1 wherein said step of measuring a read signal energy responsive to the interference bit patterns comprises:

selecting a test bit pattern having a frequency higher than the first frequency;

recording the test pattern at the nominal track centerline location; and during said reading step, digitally detecting read signal components responsive to the interferences bit patterns so as to form an indication of energy from the interference bit patterns.

3. A method according to claim 2 wherein said selecting the test bit pattern includes selecting the test bit pattern so that the test bit pattern will produce a read channel response substantially orthogonal to the interference bit patterns.

4. A method according to claim 3 wherein the test bit pattern and the interference bit pattern each consists of a respective square-wave pattern.

5. A method according to claim 3 wherein the period of each test bit pattern is equal to an integer multiple of the interference bit pattern period.

6. A method according to claim 3 wherein the test bit pattern has a frequency equal to an even multiple of the interference bit pattern frequency so that harmonies of the interference bit patterns recorded in the offset positions will be orthogonal to the harmonics of the selected track.

7. A method according to claim 2 wherein said detecting step includes: generating a first digital periodic signal having a frequency equal to the test bit pattern frequency; and arranged to produce a series of noiseless digital samples associated with the recorded test bit pattern; and synchronously correlating the first digital periodic signal to noisy digital samples formed in the partial response read channel while reading the selected track, thereby correlating the digital samples to the test bit pattern.

8. A method according to claim 7 and further comprising:

generating a quadrature phase signal 90 degrees out of phase relative to the first digital periodic signal; and synchronously correlating the quadrature phase signal to the digital samples formed in the read channel while reading the selected track.

9. A method according to claim 8 wherein the first digital periodic signal and the quadrature phase digital periodic signal each consists of a respective square-wave pattern having a respective period equal to a respective integer multiple of bit periods; and wherein said correlating steps includes:

multiplying the read channel digital samples by the first digital periodic signal so as to form a first series of products;

accumulating a sum of the first series of products;

multiplying the read channel digital samples by the quadrature phase digital periodic signal so as to form a second series of products;

accumulating a sum of the second series of products; and combining the sums of the first and second series of products.

10. A method according to claim 9 wherein said combining step includes:

squaring the accumulated sums of each of the first and second series of products so as to form first and second squared terms, respectively; and summing the first and second squared terms thereby producing a number indicative of an amount of power in the digital samples attributable to the second test bit patterns recorded on the first and second interference tracks on the media.

11. A disk drive comprising:

a rotatable magnetic data storage disk;

at least one data transducer assembly controllably positionable at concentric positions adjacent the disk by a rotary actuator, the data transducer including a magneto-resistive read, inductive write transducer head assembly;

read channel electronics coupled to the transducer assembly and including a partial response detector having a filter for generating digital sample responsive to read signals during disk drive data read operations;

means for recording a predetermined interference bit pattern onto each of first and second interference positions radially offset to respective sides of a selected track on the data storage disk;

means for recording a predetermined test bit pattern onto the selected track of the disk, the test bit pattern having a selected frequency higher than the interference bit pattern frequency;

control means for setting the read channel gain loop to a predetermined fixed gain mode of operation while reading the selected track;

means for generating a first digital test signal having a frequency equal to the test bit pattern frequency;

a first correlation circuit for correlating the first digital test signal to the digital samples generated by the partial response detector while reading the selected track;

means for generating a second digital test signal that is 90 degrees out of phase relative to the first digital test signal;

a second correlation circuit for correlating the second digital test signal to the digital samples generated by the partial response detector while reading the selected track; and means for combining the outputs of the first and second correlation circuits to form an indication of the amount of interference energy resulting from the recorded interference bit patterns at a selected lateral position of the head assembly, for use in locating a lateral position of the head assembly where said interference energy is minimized.

12. A disk drive according to claim 11 wherein each of the first and second correlation circuit includes a multiplier arranged for multiplying each bit of the corresponding digital signal times a corresponding read channel digital sample bit so as to produce a respective series of products, and an adder arranged for accumulating a sum of the corresponding series of products.

13. A disk drive according to claim 12 wherein the combining means includes means for squaring each of the accumulated sums of products provided by the respective adders; and means for summing the squared accumulated sums of products so as to form an output value indicative of a total interference from the first and second interference tracks.

14. In a disk drive having a magneto-resistive read, inductive write transducer head assembly coupled to a read channel including a partial response detector, the partial response detector having an automatic gain loop and a FIR filter, a method of estimating a micro-jog distance for a selected track on the disk drive recording media, the selected track having a nominal centerline location and track pitch and the method comprising the steps of:

recording a first test bit pattern onto the selected track;

laterally positioning the transducer head assembly over the selected track;

disabling the automatic gain loop in the partial response detector so that it has a predetermined, fixed gain value;

setting the FIR filter so as to operate in a static mode;

reading the selected track, thereby forming a series of equalized samples at the output of the FIR filter responsive to the recorded first test bit pattern;

matched filtering the equalized samples to form an indication of an average energy of the detected signal over the length of the first test bit pattern;

repositioning the head assembly; and repeating said reading, material filtering and repositioning steps so as to determined a lateral position of the head assembly at which the detector signal strength is maximized; and then selecting as the micro-jog distance a distance that positions the head assembly at said position where the detected on-track signal strength is maximized during a read operation.

15. A method according to claim 14 wherein said matched filtering step includes:

providing a noiseless digital signal emulating an ideal signal expected to be produced by the partial response detector responsive to read signals representing the first test bit pattern;

multiplying together the noiseless digital signal and the equalized samples so as to form a series of products, each one of the series corresponding to a respective bit of the test bit pattern; and accumulating a sum of the series of products to form the indication of an average amplitude of the detected signal over the length of the first test bit pattern.

16. A method according to claim 15 wherein said step of providing the noiseless digital signal includes:

for each bit of the said bit sequences, generating a partial response bit that emulates the partial response detector of the read channel.

17. A disk drive comprising:

a rotatable magnetic data storage disk;

at least one magneto-resistive read, inductive write transducer head assembly controllably positionable at concentric track locations over the disk by a rotary actuator;

read channel electronics coupled to the transducer head assembly including a partial response detector for generating digital samples responsive to read signals during disk drive data read operations;

control means for setting the read channel gain loop to a predetermined fixed gain mode of operation while reading a selected track of the disk;

means for generating a first noiseless digital test signal having a pattern frequency equal to the pattern frequency of an interference bit pattern prerecorded on the disk laterally offset from the selected track centerline;

a first correlation circuit coupled to the read channel and to the first digital test signal generating means for correlating the digital samples generated by the partial response detector to the first digital test signal while reading the selected track;

means for generating a second noiseless digital test signal having a pattern frequency equal to the pattern frequency of the interference bit pattern, the second digital test signal being 90 degrees out of phase relative to the first digital test signal;

a second correlation circuit coupled to the read channel and to the second digital test signal generating means for correlating the digital samples generated by the partial response detector to the second digital test signal while reading the selected track;

means for combining output signals from the first and second correlation circuits to form an indication of an amount of interference energy resulting from the prerecorded interference bit patterns for use in locating a lateral position of the transducer head assembly where said interference energy is minimized; and means for measuring on-track read signal energy resulting from an on-track bit pattern prerecorded on the selected track while minimizing interference from the interference bit pattern.

18. A disk drive according to claim 17 wherein the matched filter includes means for generating a series of noiseless samples equal to an expected series of digital samples provided by the read channel partial response detector in response to the on-track bit pattern prerecorded on the selected track; and means for correlating the noiseless samples to the actual digital samples generated by the partial response detector while reading the selected track.

19. A disk drive according to claim 18 wherein the method filter correlating means comprises a selected one of the first and second correlation circuits, thereby reducing duplication of circuitry.

* * * * *